Patented Oct. 26, 1926.

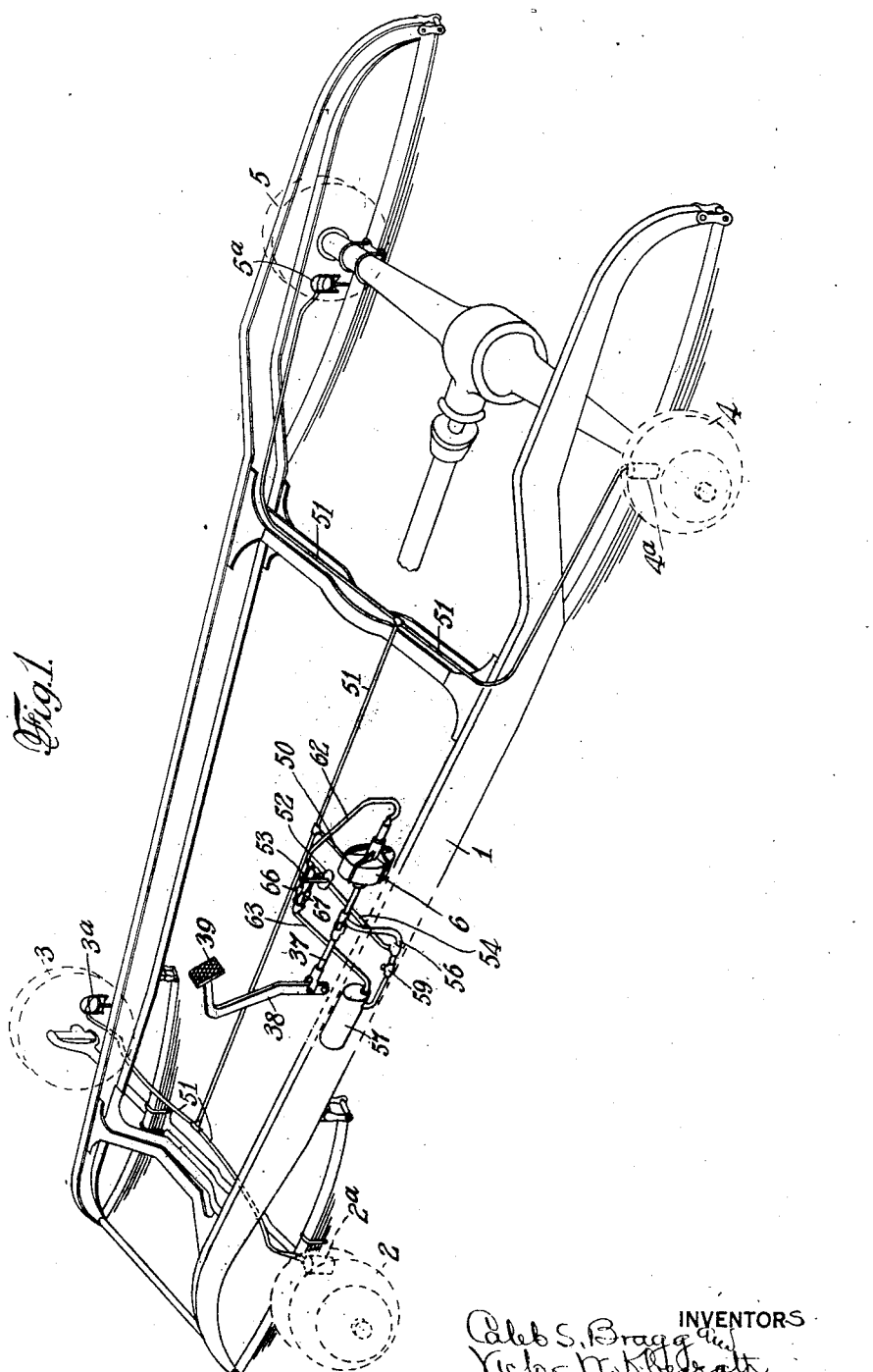

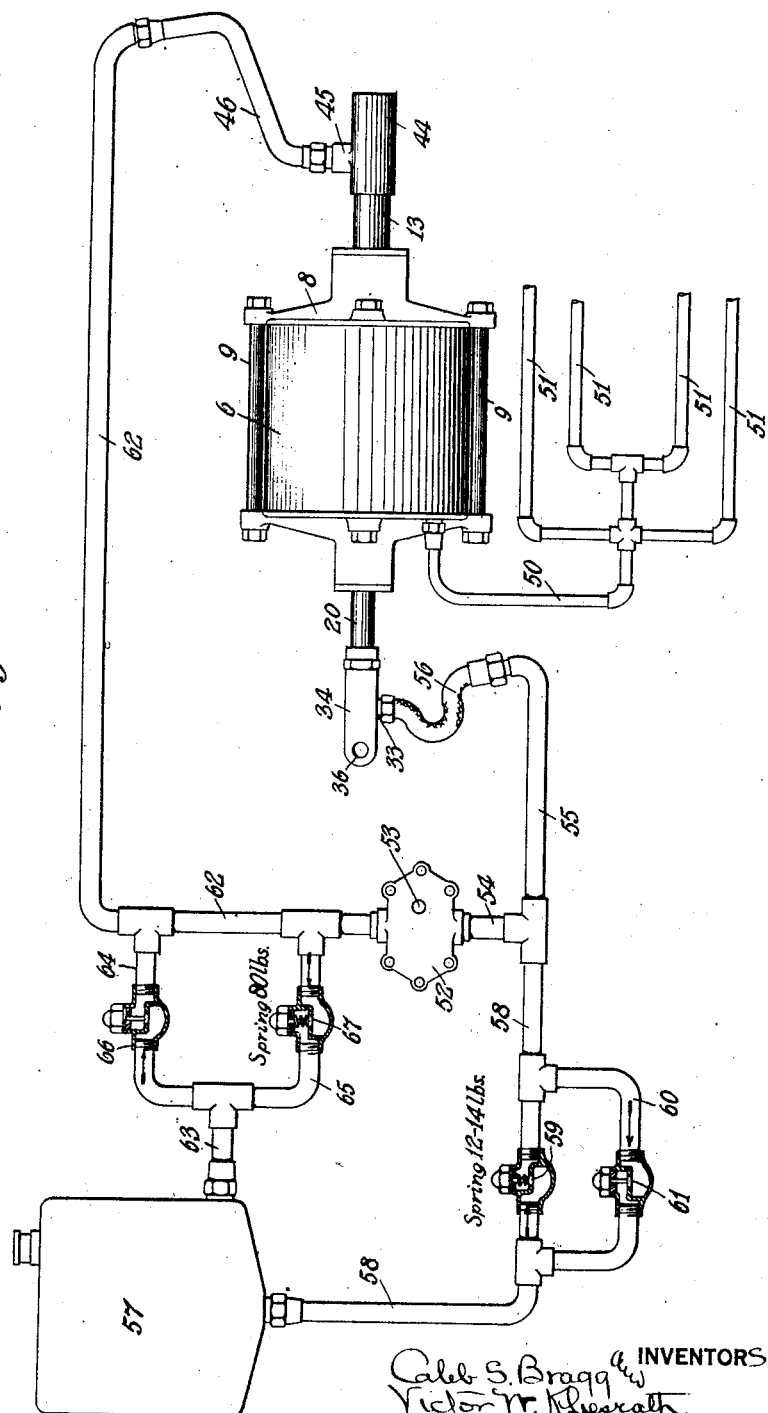

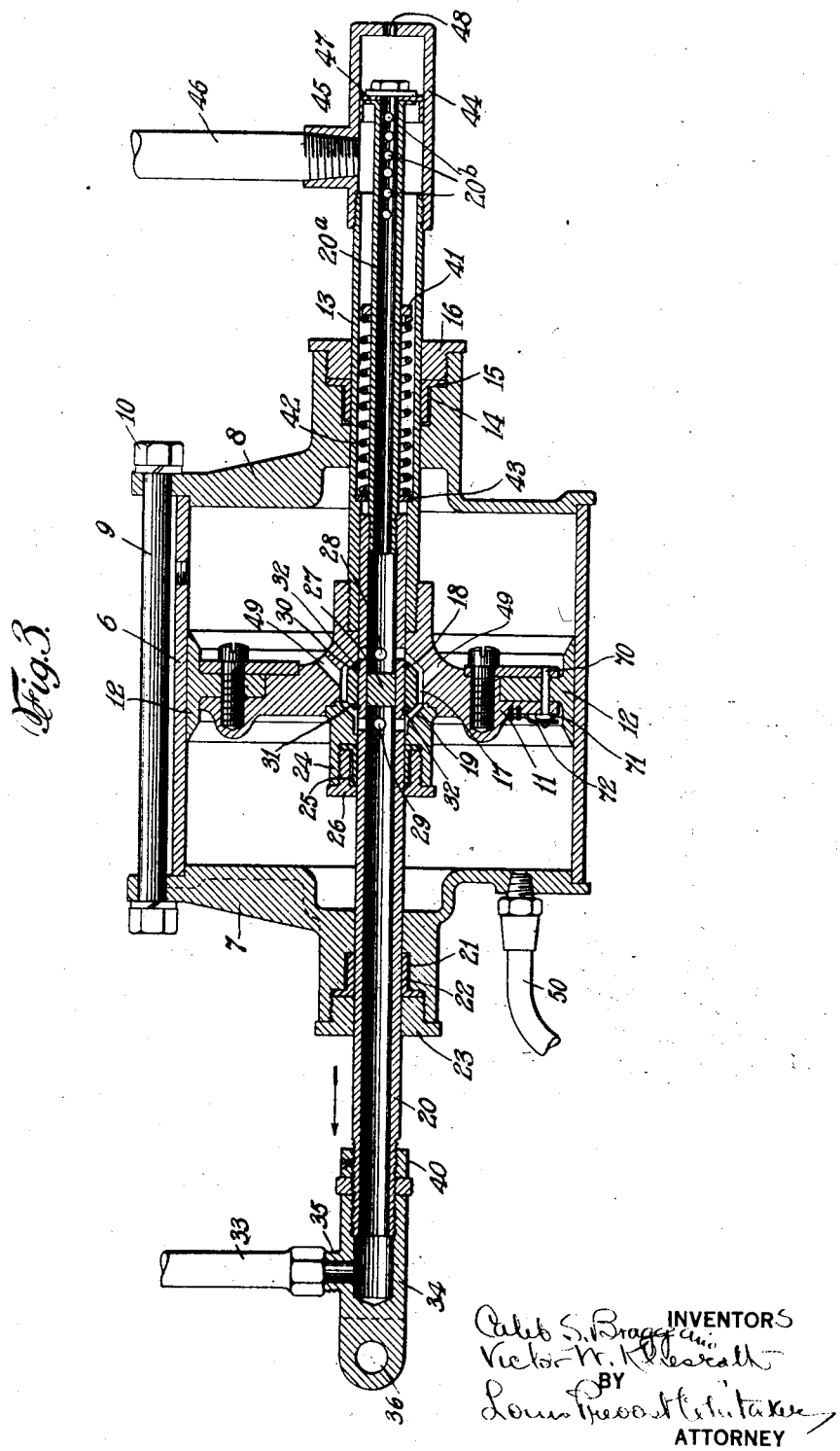

1,604,545

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

HYDRAULIC BRAKE MECHANISM FOR AUTOMOTIVE VEHICLES.

Application filed March 14, 1925. Serial No. 15,460.

Our invention consists in the novel features hereinafter described, reference being had to the accompanying drawings, which illustrate one embodiment of the same, selected by us for purposes of illustration, and the said invention is fully disclosed in the following description and claims.

Our invention consists in a hydraulic brake system for automotive vehicles, adapted especially for the larger types of vehicles, such as trucks, busses, and particularly six and eight wheel vehicles in which fluid operated brakes adapt themselves more perfectly to installation and use. For example, it is a difficult matter in mechanical brake installations to lead all of the brake rods to a single control, and maintain equalization under all road conditions, due to the varying amount of movements of the individual wheels, or pairs of wheels, with respect to the other wheels, or to the chassis. This is further complicated by the low frame construction required for passanger busses. It follows, consequently, that when one wheel, or a pair of wheels drop into a depression of considerable depth, the brakes at that time being fully applied, the operating device, whether a manually operated pedal or power cylinder, will be retracted by the uncompensated increased distance between the brake applying lever on the drum and the chassis and if the brakes are applied by a foot operated lever or pedal, a disagreeable kick being the result. If the brakes are partly applied, but not to the maximum extent, and a wheel or a pair of wheels, falls into such a depression, the result would be that the other brakes on the wheels not affected, would be applied with more force than desired by the operator, unless the foot lever was released. It therefore is desirable to apply the brakes in heavy automotive vehicles of the type mentioned, through a more flexible means, as by fluid pressure conducted through hose or flexible metallic hydraulic tubing, and we prefer to employ a liquid, and preferably oil, and to operate the brakes by means of a power actuator under the control of an operator operated lever, or pedal. Our invention, therefore, consists of a hydraulic brake system comprising a mechanically driven pump, an actuator connected therewith, and including a cylinder and a double acting piston therein, and a controlling valve permitting normally the circulation of the motor fluid through the actuator and adapted to regulate the amount of pressure applied by the actuator to the brakes, a suitable reservoir being provided for the motor fluid, and connections therewith, by means of which the pump can be continuously operated to provide the necessary movements of the motor fluid without stopping the pump. Our invention also contemplates means whereby the operator may add his physical strength to the power exerted by the power actuator in the application of the brakes. and also in the event of a partial or complete failure of the liquid pressure system. The pump is driven from the motor or the vehicle, either directly or in the latter case through the power transmission mechanism, and it is obvious, therefore, that whenever the motor is stopped, or in the latter case, whenever the vehicle is stopped, the pump would cease to be operated, and there would be no mechanical power available to keep the brakes applied if the vehicle were standing on a grade without this provision for the direct application of the physical force of the operator to the brake mechanism.

In the accompanying drawings, which illustrate one embodiment of our invention, selected by us for purposes of illustration.

Fig. 1 represents a more or less diagrammatic view of a portion of the chassis of an automotive vehicle and showing our invention embodied therein.

Fig. 2 is a diagrammatic view illustrating the power actuator, the pump, liquid reservoir, and the pipe connections appertaining thereto.

Fig. 3 represents an enlarged sectional view of the power actuator illustrated in Figs. 1 and 2.

Referring to the embodiment of the invention illustrated in the accompanying drawings, we have shown in Fig. 1, in a diagrammatic manner, an installation embodying our invention, and arranged for the application of brakes to each of the four wheels of a four wheel vehicle, it being understood that by extending the pipe connections from the actuator, as hereinafter explained, any desired number of hydraulic brake applying cylinders may be operated for the simultaneous application of brakes to any desired number of wheels, with which the vehicle may be provided, as six, eight, etc., and by providing the necessary flexible connections, brakes on the wheels of a trailing vehicle can in like manner be applied and released simultaneously with the brakes of the main vehicle. In Fig. 1, 1, represents the chassis of an automotive vehicle, provided with brake mechanism, indicated diagrammatically at 2, and 3, for the forward wheels, and also brake mechanism, indicated diagrammtically at 4 and 5, for the rear wheels, said brake mechanisms being independent, and the brake mechanism for each wheel being provided with a suitable hydraulic cylinder and piston for applying and releasing the same, said cylinders being indicated diagrammatically at $2^a$, $3^a$, $4^a$ and $5^a$. The particular type of brake mechanism and the hydraulic cylinder and piston for actuating the same, may be of any usual and desired construction, and as their specific details form no part of our present invention, they will not be specifically described. 6 represents the cylinder of our improved power actuator, shown in detail in Fig. 3, which is closed at its opposite ends by the heads, 7 and 8, connected by the bolts, 9, and nuts, 10, and within the cylinder, 6, is a double acting piston, indicated at 11, provided with gaskets, 12, having oppositely disposed portions. The hub of the piston is provided with a hollow piston rod, indicated at 13, extending through a stiffing box, 14, provided with a packing sleeve 15, preferably of rubber, held in place by a follower, 16. The hub of the piston is preferably provided with a central chamber, indicated at 17, having valve seats, 18 and 19, at its opposite ends, and a longitudinally movable valve actuating sleeve, 20, extends through the hub of the piston and other end of cylinder, which is provided with a stuffing box, 21, packing sleeve, 22, and follower, 23, said sleeve also passing through the hub of the piston and into the hollow piston rod, which it fits and with which it has a sliding engagement. In order to prevent leakage of oil from one side of the piston to the other around the sleeve, we prefer to provide the piston hub also with a stuffing box, indicated at 24, and having a packing sleeve, 25, and follower, 26, for example, for effecting a tight joint between the sleeve and piston. The packing sleeves, 15, 22 and 25, are all preferably constructed of rubber and provided with sleeve portions fitting the part passing therethrough and with flange portions to be engaged by the follower, to clamp it in the stuffing box recess, the sleeve portions being slightly smaller than the said recess, and the packing sleeves being arranged so that any leakage of oil into the recess will accumulate pressure exterior to the sleeve portion of the packing and cause it to be compressed upon the part passing therethrough, so as to maintain the joints as tight as possible and prevent leakage.

The sleeve, 20, is provided internally with a plug or partition, indicated at 27, and said sleeve is provided in rear of said partition (to the right in Fig. 3) with inlet apertures, 28, adapted to communicate with the chamber, 17, in the piston. The sleeve, is also provided, forward of the partition, 27, (to the left in Fig. 3) with outlet apertures, indicated at 29, also adapted to communicate with the chamber, 17. Within the chamber, 17, the sleeve is provided with two valves, indicated respectively at 30 and 31, for engaging, respectively the valve seats, 18 and 19. These valves may be formed as shown, in a single valve member secured to the sleeve by spring rings, indicated at 32, or otherwise, or the valves may be separate and separately connected with the sleeve, if preferred. The exterior portion of the sleeve, 20, is provided with means for connecting it with a suction or outlet pipe, indicated at 33, and also with means for connecting it with an operator operated device. In this instance we have shown the outer end of the sleeve, 20, provided with a fitting, 34, having an interior chamber communicating with the interior of the valve sleeve, and a nipple, 35, secured to the pipe, 33, said fitting being also provided with a perforated lug, or lugs, 36, which are connected by a link member, 37, with the usual brake lever or pedal lever, 38, provided with foot engaging portion, 39, as indicated in Fig. 1. The exterior portion of the sleeve, 20, is also provided with means for arresting it in such position, when the piston is in its normal or off position, at which time the hub of the piston is in engagement with the head, 8, of the actuator cylinder, the valves, 30 and 31, will be maintained in open position, and thus provide a by-pass from the apertures, 28, completely around the partition, 27, through the chamber, 17, to apertures, 29, for by-passing the motor fluid from the rear end of the sleeve, 20, to the forward end thereof, and to permit of a circulation of the motor fluid, as hereinafter explained. In this instance we have shown a stop collar, indicated at 40, on the sleeve, 20, adapted to strike against the adjacent end of the follower, 23, when the parts are in normal or off position, so as to arrest the sleeve in a position to hold both valves open. This collar may be adjusted on the sleeve, 20, and locked on any desired position, by a set screw, or otherwise, if such adjustment is necessary to secure this result. Instead of providing the pedal lever, 38, with the usual retracting spring for retracting the pedal lever and valve actuating sleeve connected therewith, we prefer to locate the retracting spring between a part connected with the sleeve, 20, and a part connected with the piston, in order that the pressure upon the foot lever required for the purpose of overcoming the retracting spring may be directly applied to the piston in a direction to apply the brake mechanism, and thus be utilized instead of being wasted, as is the case where the retracting spring is applied directly to the pedal lever. In this instance we have shown the valve actuating sleeve, 20, provided with a hollow extension or tube, 20ª, provided with a collar, 41, threaded, and a retracting spring 42, is located within a recessed portion of the hollow piston, 13, and surrounding the sleeve extension, 20ª, and engaging a shoulder on the interior of the piston rod, in this instance a washer, 43, being interposed between said shoulder and the spring. The outer end of the hollow piston rod is shown as provided with a hollow fitting, 44, having a lateral connection, 45, to which an inlet pipe, 46, for motor fluid is connected, and the sleeve extension, 20ª, is provided with a plurality of apertures, 20ᵇ, to permit the motor fluid to enter the interior of the sleeve extension, 20ª, and sleeve, 20, and pass through the inlet apertures, 28. In order to maintain the sleeve in a balanced condition so that its rearward movement will not be impeded by the pressure of the motor fluid when the brakes are fully applied, we prefer to provide the rear end of the sleeve extension, 20ª, with a small pressure equalizing piston, indicated at 47, which in this instance is located within the fitting, 44, and in rear of (to the right in Fig. 3) the connection, 45, the outer end of the fitting, 44, being provided with an aperture, 48, communicating with the atmosphere to prevent the compression of air or accumulation of oil within said fitting, which might interfere with the free operation of the sleeve. The equalizing piston is not, however, absolutely necessary, but lessens the load which otherwise would have to be overcome by the operator's foot, in order to overcome the retracting spring if it were made sufficiently strong to operate the valves against the full oil pressure to release the brakes. The piston, 11, is provided with a port, or ports, indicated at 49, connecting the chamber, 17, with the cylinder on the rear side of the piston (to the right in Fig. 3). There is no connection, however, between the portions of the cylinder on opposite sides of the piston (except as hereinafter explained), the portion of the cylinder on the forward side of the piston being filled with motor fluid and connected by a pipe, 50, with the several brake applying cylinders (as 2ª, 3ª, 4ª and 5ª) through suitable branch pipes, indicated at 51.

Referring now to Figs. 1 and 2, we will describe the system of pipe connections for effecting the proper movements of the motor liquid. Any suitable motor fluid may be employed in connection with our improved actuator, but we prefer to use an incompressible liquid, as oil, which offers the advantages that smaller cylinders may be employed for applying the individual brakes, and the oil may be handled by the gear type hydraulic pump, which is simpler in construction and operation than the reciprocating air pump, and further, there is less piping and less storage tank space required where a liquid such as oil is used. We prefer to employ castor oil as the motor liquid, particularly on account of the fact that we prefer to use rubber for packings, which is not affected injuriously by castor oil. We wish it to be understood, however, that we may use other kinds of packing and other oil than castor oil, if preferred. As best shown in Fig. 2, 52, represents the oil circulating pump, which is of the ordinary gear type of hydraulic pump, but which may be of any other desired construction, and is provided with a driving shaft, indicated at 53, which is driven in any preferred manner, either from the engine which propels the automotive vehicle, or from the power transmission mechanism, driven by the wheels. The pump, 52, is connected on the suction side by a pipe, 54, with a pipe, 55, leading to the outlet end of the valve sleeve, 20, and connected therewith by a flexible pipe section, 56, to accommodate the movements of the valve sleeve. The intake or suction pipe, 54, of the pump is also connected with an oil reservoir, indicated at 57, by an intake pipe, 58, in which is located a check valve, indicated at 59, opening in the direction of the arrow in Fig. 2, and preferably provided with a spring, set or calibrated to approximately the equivalent of atmospheric pressure, for example, twelve to thirteen pounds per square inch. The intake pipe, 58, is also provided preferably, though not necessarily, with a by-pass pipe, 60, connected to the pipe, 58, on opposite sides of the check valve, 59, the pipe, 60, being provided with a check valve, 61, having no spring, and opening in the opposite direction from the check valve, 59, as indicated by the arrows in Fig. 2. On the pressure side of the pump it is connected by a main pipe, 62, having flexible portion, 46, with the inlet connection, 45, on the hollow piston rod communicating, as before described, with the interior of the valve actuating sleeve, 20, in rear of the partition, 27. The pipe, 62, is also connected with the tank or reservoir, 57, by a pipe, 63, having two branches, 64 and 65. The branch 64, is provided with a check valve, 66, opening in the direction of the arrow in Fig. 2, and not being provided with a spring, and the branch pipe, 65, is provided with a check valve, 67, opening in the opposite direction, as indicated by the arrow Fig. 2, and provided with a spring normally holding the check valve closed, with a pressure of approximately the maximum pressure desired in the system, as, say, eighty pounds, for example.

It being understood that the actuator is in its normal or off position, in which the piston is at the rear end of the cylinder (at the right in Fig. 3) and that the valve actuating sleeve, 20, has been brought to rest under the action of the retracting spring, 42, with its stop collar, 40, in engagement with the follower, 23, so as to hold the valves, 30 and 31, in open position, and the entire pipe system hereinbefore described being filled with oil or other motor fluid, as well as the reservoir, 57, if the pump is started, it will be seen that the oil will freely circulate from the pump through the pipes, 62 and 46, through the sleeve and piston, and through the pipes, 56, 55 and 54, back to the pump. This is especially desirable and important, as the conventional type of gear pump must be kept constantly primed if instantaneous pressures are to be obtained from it, as is both desirable and necessary in the operation of brake mechanism. It would, therefore, be unwise to shut off the outlet from the pump, which would increase the necessary power required to drive it when the brake mechanism was not in use, and consequently cause more wear and more pressure with the resulting dangers of failure of operation and leakage. On the other hand, it is unwise to cut off the intake to the pump, as the interval between the intake valve and the time when the pump picks up its priming and delivers its full power, requires a varying period of time which would delay the application of the brake mechanism, and furthermore, the suction which would be created by cutting off the intake would tend to suck the air into the gears, in case there were any leaks in the system resulting in the pump becoming air bound and failing to operate for a considerable length of time after the opening of such a valve. Our construction avoids all of these difficulties and permits the continous operation of the pump when the actuator and brake mechanism are not in use, by freely circulating the motor liquid through the actuator in the manner described.

When the operator applies his foot to the brake pedal, the valve sleeve is moved forward, thereby compressing the retraction spring, 42, sufficiently to permit the valve sleeve to be moved in the direction of the arrow, Fig. 3, with respect to the piston, the physical force of the operator applied to the foot lever for the purpose of pressing this spring being transmitted to the piston in a direction to apply the brakes. This closes the valve, 31, upon its seat, and shuts off the outlet for the normal constantly circulating stream of oil, and instantly builds up a pressure which forces the oil to enter the cylinder in rear of the piston through the ports, 49, and forces the piston ahead. The forward movement of the piston forces the oil contained in the cylinder forward thereof, out through the pipe, 50, and its branch pipes, 51, to the various brake applying cylinders, as $2^a$, $3^a$, $4^a$ and $5^a$, for example, operating the pistons therein, which are connected to the brake bands, or shoes, in any usual or desired manner, and applying the brakes. When the operator stops the forward movement of his foot, the pressure behind the piston will cause its forward movement to continue until the piston has been moved forward with respect to the valve sleeve, sufficiently to open the valve, 31, to such an extent as to by-pass just sufficient quantities of oil to maintain the required amount of pressure in rear of the piston to hold it against the load of the brake mechanism, in a balanced position. It will be noted that when the maximum pressure of the oil pump has been exerted on the actuator piston, the operator may, by further depressing the brake lever, or pedal lever, add his physical force to further apply the brakes, as the relative movement, or lost motion, between the sleeve, 20, and the piston is limited, in this instance by the engagement of the respective valves, 31 and 30, with their seats. This lost motion may, however, be limited in other ways, if desired. When the brakes are applied, the valve, 31, being closed, no oil can be withdrawn from the actuator through the pipes, 56 and 55, and the pump will receive its oil from the reservoir, 57, and force the same through pipes, 62 and 46, into the actuator in rear of the piston, and when the forward movement of the valve actuating sleeve, 20, ceases, and the valve, 31, is normally opened, as before described, the circulation of the oil through the normal circulating system, represented by pipes, 62, 46, to the actuator and pipes, 56, 55 and 54, from the actuator, will be resumed. When the operator removes his foot from the brake pedal, the retracting spring will cause the valve sleeve to move rearwardly, or in a direction opposite that of the arrow in Fig. 3, thereby closing the valve, 30, and permitting the pump to withdraw oil from the cylinder in rear of the piston, through the passage, 49, the actuating valve sleeve, 20, and pipes, 56, 55 and 54. As no further oil can be pumped into the actuator from the pipe, 62, the oil, on leaving the pump, will pass through the spring actuated check valve, 67, to the reservoir, thus withdrawing the surplus oil withdrawn from the reservoir to effect the actuation of the actuator, and causing the piston to move back to its normal or off position, thereby withdrawing oil through the pipes, 50 and 51, from the brake applying cylinders, as 2$^a$, etc. Just before the piston reaches its normal position, the valve sleeve will be arrested by the collar, 40, and the further movement of the piston will open the valve, 30, and restore the normal circulating system previously described. The spring normally holding the check valve, 67, in closed position, is set to the desired operating pressure, as before stated, which must be less than the normal pressure of the pump, in order to provide an outlet for the oil, which is withdrawn from the actuator to return the piston to, or towards, normal position. The check valve, 59, is, as before stated, provided with a spring exerting a pressure of approximately atmospheric pressure, tending to hold it closed, so that on the closing of the valve, 30, the pump will suck the oil out of the actuator and effect the retracting action, up to approximately atmospheric pressure, instead of drawing oil from the reservoir, and thus return the piston to or toward its normal position. Our improved construction also provides means by which the brakes may be applied by the physical power of the operator, for example, when the pump is not in operation. Assuming that the pump is not running, the operator may, by applying his physical power to the foot lever, move the valve sleeve, 20, forward so as to close the valve, 31, and thereafter positively move the piston forward, the necessary oil required to keep the cylinder in rear of the piston filled being supplied from the reservoir, 57, through the check valve, 66, and flowing therethrough in the direction of the arrow, Fig. 2. As the piston moves forward, the pressure exerted thereon by the operator, will be transmitted to the oil forward of the piston and through the pipes 50 and 51, to the several brake applying cylinders connected therewith. When the foot lever is released, the valve sleeve will be shifted by the retracting spring, 42, so as to close the valve, 30, leaving the valve, 31, open and the load of the applied brakes will tend to return oil from the brake applying cylinders through pipes, 51 and 50, to the forward side of the piston and move the piston rearwardly, the oil within the actuator in rear of the piston passing out through the pipes, 56 and 55, and passing through the pipes, 58, and by-pass, 60, and through the check valve, 61, in the direction of the arrow, back to the reservoir.

The by-pass, 60, and check valve, 61, are unnecessary if the oil pump is operated by the motor, as the oil could be withdrawn from the actuator as soon as the motor was started, when it was desired to release the brakes, and unless the motor were started, vehicles of this size could not be conveniently moved. However, when the oil pump is driven from the transmission members connected to the rear wheels and not to the motor, the oil could not be withdrawn from the cylinder to release the brakes until the vehicle was actually in motion, unless the by-pass, 60, and check valve, 61, were provided, and this in most cases would be objectionable. We, therefore, prefer to provide such a by-pass and check valve where the pump is driven from the transmission mechanism, and it may be provided in all installations, if desired.

It will be noted that the actuator herein shown and described performs two important functions. The piston divides the cylinder into two entirely separate chambers, having no connection with each other except as hereinafter noted. One of these chambers, on one side of the piston, which may be termed the service chamber, is connected with the brake applying cylinders. The other of said chambers, on the other side of the piston, which may be termed the actuator chamber, is connected with the source of pressure fluid admitted to and discharged therefrom under the control of the valve mechanism, the movements of the piston produced by the accumulation of pressure or release of pressure in the actuator chamber (or by the physical force exerted by the operator) effecting the application or release of the brakes, thus simplifying the apparatus and dispensing with a special pressure cylinder and piston.

When it is not essential to the operation of our improved apparatus, we prefer to in some instances provide means for replenishing the oil in the pressure system connected with the brake applying cylinders to supply a deficit which may be caused by leakage, or by a break in the piping, for example. For this purpose, in some instances, we may provide the piston with a passage which may be in the form of an aperture, 70, or a by-pass, connecting the service chamber of the actuator with the actuator chamber, thereof, which aperture is provided with a check valve, 71, opening in the direction of the service chamber, but normally held closed by a spring, 72.

When the brakes are to be applied and pressure is accumulated in the actuator piston, a substantially equal pressure will exist in the service chamber on the opposite side of the piston, and the valve, 71, will remain closed. When the pressure of the operator's foot is applied to the piston the pressure in the service chamber will be greater than in the actuator chamber, and the valve, 71, will be held closed. If there is a leak in the service pipes, however, or a break therein, so that an escape of oil takes place, the pressure in the service chamber will be less than that in the actuator chamber when the actuator is operated to the full extent, and in such case, or when for any reason the pressure in the service chamber is less than that in the actuator chamber, the oil will pass through the aperture (or by-pass) 70, and open the valve, 71, and bring the pressure in the service pipes up to that in the actuator chamber, so as to insure the proper operation of the brake applying pistons. The oil will be compensated for in the main circulating system from the oil reservoir. As before stated the aperture (or by-pass) 70 and valve 71 may be omitted, if desired.

What we claim and desire to secure by Letters Patent is:—

1. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, and said actuator chamber being provided with liquid connections for admitting motor liquid to and discharging it from said chamber, and valve mechanism for controlling the said connections from said actuator chamber.

2. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, and said actuator chamber being provided with liquid connections for admitting motor liquid to and discharging it from said chamber, and valve mechanism for controlling the said connections from said actuator chamber, an operator operated part for controlling said valve mechanism, operatively connected with the piston by means permitting lost motion, whereby the physical power of the operator may be applied to the piston in a direction to apply the brakes in addition to the power of the actuator or in case the actuator is inoperative.

3. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valve mechanism for controlling said connections, and an operator operated device for controlling said valve mechanism.

4. In a hydralic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, and an operator operated device connected with said valves, and capable of holding said valves in open position to permit a continuous circulation of liquid through said connections and to close one or other of said valves to effect a delivery of pressure liquid into, or a discharge of pressure liquid from said actuator chamber.

5. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, a valve actuating device connected with said valves, and constructed to hold them in open position to permit a continuous circulation of liquid through said connections and to close either of said valves to effect a delivery of pressure liquid to or a discharge of pressure liquid from said actuator chamber, an operator operated device connected with said valve actuating device, and means for arresting said valves in open position when the piston is in the normal or off position.

6. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, a valve actuating device connected with said valves, and constructed to hold them in open position to permit a continuous circulation of liquid through said connections and to close either of said valves to effect a delivery of pressure liquid to or a discharge of pressure liquid from said actuator chamber, an operator operated device connected with said valve actuating device, and means for arresting said valves in open position when the piston is in the normal or off position, said valve actuating device being operatively connected with the piston by means permitting sufficient lost motion to effect the closing of either of said valves, whereby the piston may be actuated by the operator to add his physical force to the power of the actuator, or in case the source of power fails.

7. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, and an operator operated device connected with said valves, and capable of holding said valves in open position to permit a continuous circulation of liquid through said connections, and to close one or other of said valves to effect a delivery of pressure liquid into or a discharge of presure liquid from said actuator chamber, and a liquid reservoir, operatively connected with said pump, on the suction side, for supplying the pump, when the suction connection with said actuator chamber is closed.

8. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, and an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, a liquid reservoir, operatively connected with said pump, on the suction side, for supplying the pump, when the suction connection with said actuator chamber is closed, a check valve for said reservoir connection, and a spring for holding said check valve closed to insure the withdrawal of liquid from the actuator chamber when the suction connection of the pump therewith is open.

9. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, a liquid reservoir, a connection therefrom to the suction side of the pump for supplying the pump when the suction connection with the actuator chamber is closed, a connection from the reservoir to the pressure side of the pump to permit the pump to discharge liquid into said reservoir when the connection from the pump to the actuator is closed, and automatic valves controlling said reservoir connections.

10. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, a liquid reservoir, a connection therefrom to the suction side of the pump for supplying the pump when the suction connection with the actuator chamber is closed, a check valve in said connection, a spring holding said check valve closed with a pressure approximately equal to atmospheric pressure, a connection from the reservoir to the pressure side of the pump, a check valve controlling said connection, and a spring for said check valve normally holding it closed with a predetermined pressure, not exceeding the pressure which the pump is capable of producing.

11. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, said operator operated device being connected with the piston by means permitting lost motion, a liquid reservoir, a connection from said reservoir to said actuator chamber, for supplying liquid thereto when the piston is actuated by the operator operated device, and a check valve in said connection.

12. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, said operator operated device being connected with the piston by means permitting lost motion, a liquid reservoir, connections from the reservoir to the pump on the suction side and pressure side thereof, a spring actuated check valve controlling each of said connections, a connection from said reservoir to said actuator chamber for supplying liquid thereto when the piston is actuated by the operator operated part, and a check valve for said connection.

13. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, a liquid reservoir, an auxiliary suction connection therefrom to the suction side of the pump, for supplying the pump when the suction connection from the actuator chamber is closed, a normally closed spring actuated valve in said auxiliary suction connection for preventing the withdrawal of liquid from the reservoir when the suction connection from the pump to the actuator is open, a by-pass around said spring actuated valve, and an auxiliary check valve in said by-pass opening in the opposite direction from the said spring actuated valve.

14. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, a liquid reservoir, an auxiliary suction connection therefrom to the suction side of the pump, for supplying the pump when the suction connection from the actuator chamber is closed, a normally closed spring actuated valve in said auxiliary suction connection, a by-pass around said spring actuated valve, and an auxiliary check valve in said by-pass opening in the opposite direction from the said spring actuated valve, a connection from the reservoir to the pump on the pressure side thereof, and a check valve in said connection normally held closed by a spring of predetermined pressure.

15. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, a liquid reservoir, an auxiliary suction connection therefrom to the suction side of the pump, for supplying the pump when the suction connection from the actuator chamber is closed, a main check valve in said auxiliary suction connection, a by-pass around said check valve, and an auxiliary check valve in said by-pass opening in the opposite direction from the said main check valve, said main check valve being normally held closed by a spring of predetermined pressure, to prevent the withdrawal of liquid from the reservoir when the suction connection from the pump to the actuator is open, a connection from said reservoir to the pump on the pressure side, a check valve for said connection normally held closed by a spring of predetermined pressure, said operator operated part being connected to the piston by means permitting lost motion, a connection from said reservoir to the actuator chamber to supply liquid thereto when the piston is moved by said operator operated part, and a check valve in said connection to prevent the return of liquid through said connection to the reservoir.

16. In a hydraulic brake system, an actuator comprising a cylinder, closed at both ends, a piston in said cylinder dividing it into a service chamber, and a separate actuator chamber, a valve chamber in said piston, connected with the actuator chamber, means for supplying liquid to and withdrawing it from the valve, a valve actuating sleeve extending through said cylinder piston, and said valve chamber, and provided with separated inlet and outlet passages adapted to communicate with said valve chamber, valves carried by said valve sleeve for disconnecting said valve chamber from said passages, means for connecting said service chamber with a brake applying cylinder, and an operator operated device connected with said valve sleeve, said sleeve being connected with the piston by means permitting lost motion.

17. In a hydraulic brake system, an actuator comprising a cylinder, closed at both ends, a piston in said cylinder dividing it into a service chamber, and a separate actuator chamber, a valve chamber in said piston, connected with the actuator chamber, means for supplying liquid to and withdrawing it from the valve, a valve actuating sleeve extending through said cylinder piston and said valve chamber, and provided with separated inlet and outlet passages adapted to communicate with said valve chamber, valves carried by said valve sleeve for disconnecting said valve chamber from said passages, means for connecting said service chamber with a brake applying cylinder, and an operator operated device connected with said valve sleeve, said sleeve being connected with the piston by means permitting lost motion, and a retracting spring interposed between said sleeve and said piston, whereby pressure applied to the operator operated device to move the valve sleeve in the direction to apply the brakes will be transmitted by said spring to the piston and to the brake applying cylinder.

18. In a hydraulic brake system, an actuator comprising a cylinder, closed at both ends, a piston in said cylinder dividing it into a service chamber, and a separate actuator chamber, a valve chamber in said piston, connected with the actuator chamber, means for supplying liquid to and withdrawing it from the valve, a valve actuating sleeve extending through said cylinder piston and said valve chamber, and provided with separated inlet and outlet passages adapted to communicate with said valve chamber, valves carried by said valve sleeve for disconnecting said valve chamber from said passages, means for connecting said service chamber with a brake applying cylinder, and an operator operated device connected with said valve sleeve, said sleeve being connected with the piston by means permitting lost motion, and a retracting spring interposed between said sleeve and said piston, whereby pressure appiled to the operator operated device to move the valve sleeve in the direction to apply the brakes will be transmitted by said spring to the piston and to the brake applying cylinder, and a pressure fluid equalizing piston connected with said sleeve, and working in a cylindrical part.

19. In a hydraulic brake system, the combination with an actuator comprising a cylinder, closed at both ends, a piston therein dividing the cylinder into a service chamber, and a separate actuator chamber, a valve chamber in said piston communicating with said actuator chamber, a valve actuating sleeve extending through said cylinder and piston and said valve chamber, and provided with separated inlet and outlet passages, adapted to communicate with said valve chamber, a pump, a connection from the pressure side of said pump to said inlet passage, a connection from said outlet passage to the suction side of the pump, a connection from the service chamber to a brake actuating cylinder, valves carried by the said sleeve for controlling said inlet and outlet passages, and means for holding said valve sleeve in position to maintain both of said valves in open position, and permit a continuous circulation of liquid by said pump through said valve chamber when the piston is in normal or off position.

20. In a hydraulic brake system, the combination with an actuator comprising a cylinder, closed at both ends, a piston therein dividing the cylinder into a service chamber, and a separate actuator chamber, a valve chamber in said piston communicating with said actuator chamber, a valve actuating sleeve extending through said cylinder and piston and said valve chamber, and provided with separated inlet and outlet passages, adapted to communicate with said valve chamber, a pump, a connection from the pressure side of said pump to said inlet passage, a connection from said outlet passage to the suction side of the pump, a connection from the service chamber to a brake actuating cylinder, valves carried by the said sleeve for controlling said inlet and outlet passages, and means for holding said valve sleeve in position to maintain both of said valves in open position, and permit a continuous circulation of liquid by said pump through said valve chamber when the piston is in normal or off position, said sleeve being connected with the piston by means permitting lost motion, a liquid reservoir, operatively connected with the pump, spring actuated check valves controlling said connections, a separate connection from the reservoir to said actuator chamber, and a check valve controlling said connection.

21. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with liquid passages for connecting it to a hydraulic brake actuating cylinder, and said actuator chamber being provided with liquid connections for admitting motor liquid to and discharging it from said chamber, and valve mechanism for controlling the said connections from said actuator chamber, said actuator being provided with a passage for establishing communication between the service chamber and the actuator chamber, and a normally closed valve for controlling said chamber, constructed to be opened when the pressure in the actuator chamber exceeds that in the service chamber to supply additional liquid to the service chamber and its connections.

22. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with liquid passages for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections, and to close one or other of said valves to effect a delivery of pressure liquid into, or a discharge of pressure liquid from said actuator chamber, a liquid reservoir, a connection therefrom to the suction side of the pump for supplying the pump when the suction connection with the actuator chamber is closed, a connection from the reservoir to the pressure side of the pump to permit the pump to discharge liquid into said reservoir when the connection from the pump to the actuator is closed, and automatic valves controlling said reservoir connections, said actuator being provided with a passage for establishing communication between the service chamber and the actuator chamber, a valve for controlling said passage, and a spring normally holding said valve in closed position but constructed to yield when the pressure in the actuator chamber exceeds that in the service chamber to supply additional liquid to the service chamber and its connections.

23. In a hydraulic brake system, a power actuator comprising a cylinder closed at both ends, a piston in said cylinder dividing it into a service chamber at one side of the piston, and an actuator chamber separate therefrom on the other side of the piston, said service chamber being provided with a liquid passage for connecting it to a hydraulic brake actuating cylinder, a liquid pressure pump, a connection from the pressure side of said pump to said actuator chamber, a connection from the suction side of said pump to said actuator chamber, valves for controlling said connections, an operator operated device connected with said valves, and capable of holding said valves in open position to permit a continuous circulation of liquid through said connections and to close one or other of said valves to effect a delivery of pressure liquid into, or a discharge of pressure liquid from said actuator chamber, a liquid reservoir, a connection therefrom to the suction side of the pump for supplying the pump when the suction connection with the actuator chamber is closed, a connection from the reservoir to the pressure side of the pump to permit the pump to discharge liquid into said reservoir when the connection from the pump to the actuator is closed, and automatic valves controlling said reservoir connections, said actuator piston being provided with a passage therethrough for establishing communication between the service chamber and the actuator chamber, and a normally closed spring actuated valve for said passage constructed to yield when the pressure in the actuator chamber exceeds that in the service chamber to supply additional liquid to the service chamber, and equalize the pressure therein with that in the actuator chamber.

In testimony whereof we affix our signatures.

CALEB S. BRAGG.
VICTOR W. KLIESRATH.